(12) United States Patent
Paczkowski et al.

(10) Patent No.: US 11,395,139 B1
(45) Date of Patent: Jul. 19, 2022

(54) NETWORK PROFILE ANTI-SPOOFING ON WIRELESS GATEWAYS

(71) Applicant: T-MOBILE INNOVATIONS LLC, Overland Park, KS (US)

(72) Inventors: Lyle W. Paczkowski, Mission Hills, KS (US); David Hufker, Shawnee, KS (US); George Jason Schnellbacher, Overland Park, KS (US); Michael David Svoren, Jr., Overland Park, KS (US)

(73) Assignee: Sprint Communications Company LP, Overland Park, KS (US)

( * ) Notice: Subject to any disclaimer, the term of this patent is extended or adjusted under 35 U.S.C. 154(b) by 543 days.

(21) Appl. No.: 16/430,382

(22) Filed: Jun. 3, 2019

(51) Int. Cl.
| | |
|---|---|
| *H04L 9/30* | (2006.01) |
| *H04L 29/06* | (2006.01) |
| *H04W 12/06* | (2021.01) |
| *H04L 9/40* | (2022.01) |
| *H04W 12/12* | (2021.01) |
| *H04W 84/12* | (2009.01) |
| *H04W 88/16* | (2009.01) |

(52) U.S. Cl.
CPC ......... *H04W 12/06* (2013.01); *H04L 63/0281* (2013.01); *H04L 63/1483* (2013.01); *H04W 12/12* (2013.01); *H04W 84/12* (2013.01); *H04W 88/16* (2013.01)

(58) Field of Classification Search
CPC .... H04W 12/06; H04W 84/12; H04L 63/0281
See application file for complete search history.

(56) References Cited

U.S. PATENT DOCUMENTS

| | | | | |
|---|---|---|---|---|
| 10,299,128 B1 * | 5/2019 | Suthar | ................... | H04L 9/3247 |
| 2009/0093232 A1 * | 4/2009 | Gupta | ................... | H04L 63/104 |
| | | | | 455/410 |
| 2014/0223538 A1 * | 8/2014 | Van De Velde | .... | H04L 12/4633 |
| | | | | 726/12 |

\* cited by examiner

*Primary Examiner* — Wasika Nipa

(57) ABSTRACT

A mechanism of authenticating a communication device onto a radio access network via a private wireless gateway is described. This includes communicating with a communication device via a first wireless interface authentication information, a preferred roaming list (PRL), and an initial access value are obtained from the communication device. A first expected access value is determined based on rolling code data and a secret function. The PRL is authenticated when the first expected access value matches the initial access value. The communication device is proxied onto a radio access network via a second wireless interface. The proxying includes providing the authentication information and the PRL to a cell site attached to the radio access network.

16 Claims, 9 Drawing Sheets

NETWORK PROFILE ANTI-SPOOFING ON WIRELESS GATEWAYS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices provide authentication information to cell sites when they attach to a radio access network to receive wireless communication services. This authentication information allows a wireless service provider to identify the mobile communication device and determine if the device has privileges for accessing its network. The mobile communication device generally maintains a subscription with a home service provider and receives such authentication information to allow the mobile communication device to access the home service provider's network according to the subscription. However, in some instances the mobile communication device leaves the coverage area of the home service provider's network. The home service provider generally maintains agreements with other service providers denoted herein as roaming service providers. Pursuant to such agreements, a roaming service provider may accept the authentication information from the mobile communication device and allow the mobile communication device to access the roaming service provider's network. The roaming service provider can then charge the home service provider for allowing the mobile communication device to use the roaming service provider's network.

SUMMARY

In an embodiment, a method of authenticating a communication device onto a radio access network via a private wireless gateway is disclosed. The method comprises communicating, by a private wireless gateway, with a communication device via a first wireless interface. The method further comprises obtaining, by the private wireless gateway, authentication information, a preferred roaming list (PRL), and an initial access value from the communication device. The method further comprises determining, by the private wireless gateway, a first expected access value based on rolling code data and a secret function. The method further comprises authenticating, by the private wireless gateway, the PRL when the first expected access value matches the initial access value. The method further comprises proxying, by the private wireless gateway, the communication device onto a radio access network via a second wireless interface, the proxying including providing the authentication information and the PRL to a cell site attached to the radio access network.

In another embodiment, a private wireless gateway is disclosed. The private wireless gateway comprises a first wireless interface configured to: communicate with a communication device, and obtain authentication information, a preferred roaming list (PRL), and an initial access value from the communication device. The private wireless gateway further comprises a processor coupled to the first wireless interface. The processor is configured to: determine a first expected access value based on rolling code data and a secret function, and authenticate the PRL when the first expected access value matches the initial access value. The private wireless gateway further comprises a second wireless interface coupled to the processor, the second wireless interface configured to proxy the communication device onto a radio access network, the proxying including providing the authentication information and the PRL to a cell site attached to the radio access network.

In yet another embodiment, a method of obtaining authentication onto a radio access network via a private wireless gateway by a communication device is disclosed. The method comprises communicating, by the communication device, with a private wireless gateway via a first wireless interface. The method further comprises determining, by the communication device, an initial access value based on rolling code data and a secret function. The method further comprises providing, by the communication device, authentication information, a preferred roaming list (PRL), and an initial access value to the private wireless gateway. The method further comprises receiving, by the communication device, proxied wireless communication access to the radio access network via the private wireless gateway when the initial access value authenticates the PRL and when the authentication information and the PRL authenticates the communication device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
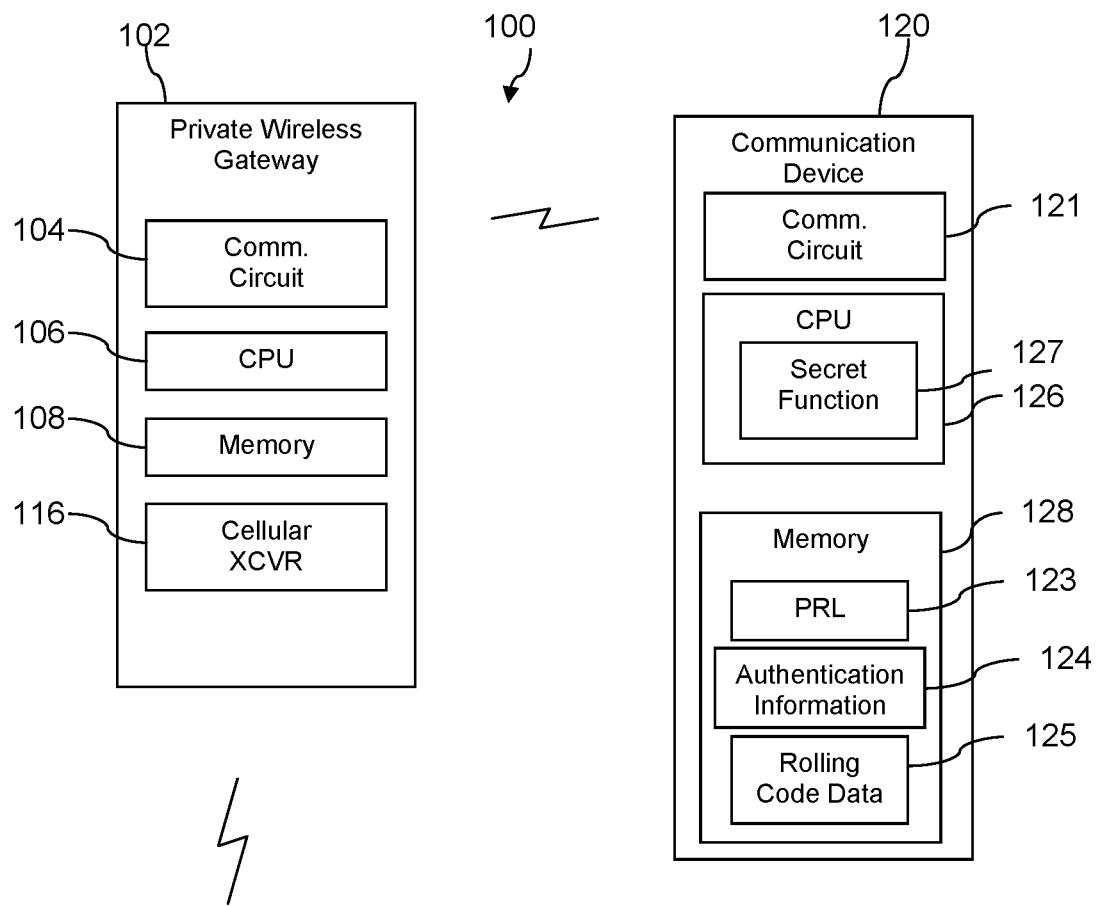
FIG. 1 is a block diagram of a communication system according to an embodiment of the disclosure.
Figure 1:
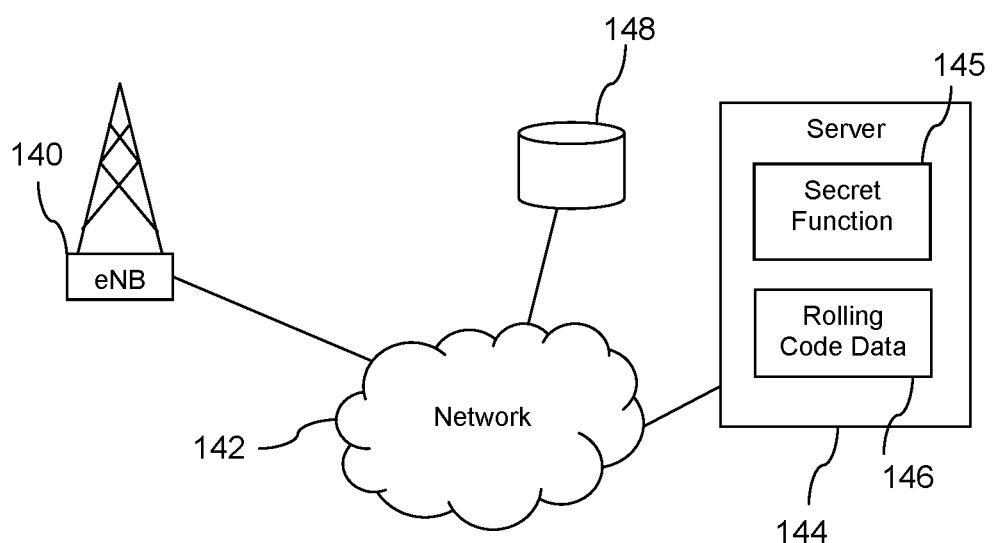

It should be understood at the outset that although illustrative implementations of be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Roaming between a home service provider network and a roaming service provider network can be accomplished by using a preferred roaming list (PRL). The PRL is stored on the mobile communication device and contains an ordered list of roaming service providers. Upon receiving signals from a cell site outside the home network, the mobile communication device can consult the PRL to determine whether access to the corresponding roaming service provider's network is allowed. The mobile communication device can then forward the authentication information and the PRL to the cell site to gain access to the roaming service provider's network if such is allowed. The roaming service provider's network can also employ the PRL to manage associated charging matters.

As part of updating the above mentioned mechanisms for use in conjunction with internet of things (IoT) devices, private wireless gateways are under development that leverage the authentication information and PRL to allow IoT devices to attach to home service provider networks and/or roaming service provider networks. An example private wireless gateway, which may be sold under the trademark MAGIC BOX, is configured to attach to a service provider network via a radio access network. The private wireless gateway may communicate with IoT devices via radio access network based technologies (e.g., fourth generation of "broadband" cellular network (4G), fifth generation of "broadband" cellular network (5G), Long term evolution (LTE), etc.) and also via local area network based wireless technologies (e.g., Institute of Electrical and Electronics Engineers (IEEE) 802.11 (Wifi), IEEE 802.15.1 (Bluetooth®), etc.) The private wireless gateway may receive authentication information and a PRL from an IoT device and then proxy the IoT device onto the attached service provider network, which may be a home service provider network for some IoT devices and a roaming service provider network for other IoT devices. In some cases the private wireless gateway relies on PRLs received via wireless communication protocols that are not designed for use in conjunction with PRLs. As a specific example, local area network based wireless technologies may not be designed to consider roaming, and hence may not be designed to provide any special significance to PRLs.

Such non-standard use of PRLs by the private wireless gateway may result in certain security vulnerabilities. For example, a malicious entity may spoof (e.g., provide a counterfeit copy of) authentication information from a valid user and provide such information to the private wireless gateway. The malicious entity may also provide a fake PRL (or spoofed and modified PRL) to indicate that a device operated by the malicious entity is roaming. The private wireless gateway may then attempt to proxy the device operated by the malicious entity onto an attached service provider network. As the authentication information is associated with a valid user, the private wireless gateway may then obtain access to the service provider network on behalf of the device. However, the fake/modified PRL may prevent the private wireless gateway from reporting such access to the appropriate billing system at the alleged home service provider network. The net result is that the malicious entity gains access to the service provider network via the private wireless gateway, but such access may be configured to evade detection from the billing system. Accordingly, the malicious entity effectively gains free unauthorized access to the service provider network in a manner that is not easily detectible, and hence may not be readily terminated by the network. As the private wireless gateway is a gateway, this process could be used repeatedly by many devices, such as IoT devices. This process could lead to a scenario where the private wireless gateway provides an entire sub-network (e.g., for an entire building) with unauthorized access to a service provider network.

It should also be noted that IoT devices communicating via the private wireless gateway may be simple and may include very limited hardware resources for processing and communication. Hence, security protocols that employ heavy processing and/or communication overhead may be unusable to address this issue as such security protocols may be unusable by even legitimate IoT devices. Accordingly, complex solutions to the above mentioned security issue would render the private wireless gateway unusable for its intended purpose of an IoT compliant gateway.

The present disclosure teaches a system and method that provides a technical solution to the technical problem of a private wireless gateway providing undetectable unauthorized access to a service provider network due to an altered PRL. In some examples, PRLs can be kept confidential and communicated as trusted data over trusted end-to-end links in order to prevent spoofing. Further, PRLs can be protected by rolling codes. A device providing a PRL without the proper rolling code is ignored by the private wireless gateway. In this manner, the private wireless gateway denies access to malicious entities that attempt to exploit protocol based security flaws related to fake and/or altered PRLs. The use of rolling codes is beneficial as rolling codes are computationally simple, and therefore most IoT devices should be capable of managing rolling codes without requiring additional specialized hardware. The present disclosure includes several embodiments for providing and recognizing a valid rolling code associated with a PRL.

In a first example, a communication device is provisioned with a secret algorithm (e.g., a hashing function) for generating a rolling code when the communication device is provisioned for use with the service provider network. Upon first communicating with the communication device, the private wireless gateway provides rolling code data, such as a seed value. The communication device then responds with the authentication information, the PRL, and an access value generated based on the seed value and the secret algorithm. If the communication device is fraudulent, then the communication device does not have access to the secret algorithm, and is therefore unable to provide the correct access value based on the rolling code data. Further, the communication device is expected to provide additional access values in conjunction with subsequent access based requests. Such further access values are generated in sequence based on the secret algorithm and the rolling code data. This causes the access values to change for further access attempts. Accordingly, a fraudulent communication device is unable to snoop and reuse an access value from a legitimate communication device as such access values are not static.

In a second example, a communication device is provisioned with a secret algorithm for generating a rolling code and device specific rolling code data when the communication device is provisioned for use with the service provider network. The device specific rolling code data (e.g., seed and/or the next expected access code) can then be stored in the network. In such an example, the private wireless gateway only communicates with devices that provide a PRL and a corresponding access code determined based the device specific rolling code data. As with the first example, a fraudulent communication device is unable to provide the proper access value and is unable to snoop an access value from a legitimate communication device. In one specific example, the device specific rolling code data is stored in a database accessible by the private wireless gateway. Upon first communicating with the communication device, the private wireless gateway can obtain the device specific rolling code data and/or the secret algorithm to determine the expected access value. The private wireless gateway can then compare the expected access value with the received access value to determine if the communications device is legitimate and hence has a legitimate PRL. In another specific example, block chain technology can be used. The communication device can be provisioned with the device specific rolling code data and the secret algorithm and also associated with a block chain ledger. The block chain ledger can then be updated with relevant rolling code data each time the communication device makes an access based request. Accordingly, any private wireless gateway can determine the expected access code for a corresponding communication device by checking the current value of the block chain ledger and applying the secret algorithm. By using such device specific rolling code data, a fraudulent device would not receive initial rolling code data from a private wireless gateway, and hence would not have the opportunity to attempt to use brute force mechanisms to crack the secret algorithm (e.g., by changing identity and repeatedly requesting an initial wireless communication link to receive an initial seed).

The disclosed PRL trust mechanisms provide benefits in that such mechanisms prevent PRL spoofing. This in turn prevents malicious entities from using such spoofed PRLs to access a service provider radio access network via a private wireless gateway as a roaming device in a manner that is not easily traceable back to a user account. Further, the disclosed PRL trust mechanisms provide security using approaches that employ small amounts of processor, memory, and/or communication resources. Accordingly, communication devices coupling through the private wireless gateway can employ such mechanisms even when such devices include simplistic and limited hardware capabilities. Further, more advanced communication devices (e.g., mobile phones, computers, tablets, etc.) can employ the disclosed PRL trust mechanisms in order to provide PRL based security using fewer hardware resources (e.g., processor, memory, and/or communication) than would be possible using protocols that employ secure network tunnels and other computationally heavy security protocols. In addition, private wireless gateways employing the disclosed PRL trust mechanisms can secure PRLs using fewer hardware resources (e.g., processor, memory, and/or communication) than when using more complex security functions. Therefore, the disclosed embodiments provide increased security, increased functionality, and reduced system resource usage while solving a technological problem specific to a network environment.

Turning now to FIG. 1, a communication system 100 is described. In an embodiment, the system 100 comprises a communication device 120. The communication device 120 can be any device capable of storing a PRL 123 and connecting to the Internet via any wireless communication technology. In some examples, the communication device 120 may be a device that is capable of employing radio access network (RAN) based technologies via an evolved node B (enodeB) cell, such as a cell site 140. Such devices may include a mobile phone, a smart phone, a personal digital assistant (PDA), a headset computer, a wearable computer, a laptop computer, a notebook computer, a table computer, etc. In other cases, the communication device 120 may be a device that is capable of employing local area network based wireless technologies such as Wifi, Bluetooth®, or other wireless technologies that wirelessly connect to a local component that is connected to a local wired network connection/link. Such devices may include IoT devices as well as many of the previously mentioned devices. IoT devices include a large group of electronic devices and/or sensors capable of being controlled/actuated and/or providing feedback via network links. As non-limiting examples, IoT devices can include consumer appliances, consumer electronics, lighting systems, heating and air conditioning systems (e.g., thermostats), security systems, commercial and/or retail electronics, etc.

The communication system 100 can also include a private wireless gateway 102. The private wireless gateway 102 can be any device capable of acting as a communication gateway between a communication device 120 and a cell site 140. Specifically, a private wireless gateway 102 is device that may act as a user equipment (UE) relay and may provide the UE with private access to a radio access network. In this context, private access indicates that the identity of the UE is hidden from outside observers. For example, private access may be accomplished by employing trust based systems and secure encryption to hide the UE's identity from outside entities that may monitor network traffic. A UE is any of a broad class of user devices with Internet connectivity, where UE includes communication device 120 and/or IoT devices. The private wireless gateway 102 can communicate with the communication device 120 via RAN based wireless technologies, local area network based wireless technologies, and even via wired communication technologies (e.g., Ethernet, universal serial bus (USB), etc.). The private wireless gateway 102 is further configured to act as a proxy to allow the communication device 120 to connect to the RAN via the cell site 140. As used herein, proxying is the process of employing an intermediate node (e.g., the private wireless gateway 102) to connect to and/or communicate with a destination node and/or destination network (e.g., a cell site 140, a network 142, a server 144, etc.) on behalf of a source node (e.g., the communication device 120). A proxy is term for the intermediate device that performs the proxying process. The term proxy may also be used as a verb (e.g., the private wireless gateway 102 may proxy the communication device 120).

The system 100 further comprises a cell site 140, a network 142, a server 144, and a data store 148. The private wireless gateway 102 is designed to communicate with the network 142 via the cell site 140 by using a cellular radio transceiver 116. The cell site 140 and at least a portion of the network 142 provides wireless communication service according to at least one of a long term evolution (LTE), a code division multiple access (CDMA), a global system for mobile communications (GSM), or a worldwide interoperability for microwave access (WiMAX) telecommunication protocol. The network 142 comprises one or more public networks, one or more private networks, or a combination thereof. While a single cell site 140 is shown in FIG. 1, it is understood that the system 100 may comprise any number of cell sites 140. The data store 148 is a network 142 accessible device configured to store data and retrieve such data upon request. The server 144 is a network 142 accessible device configured to respond to requests over the network 142, as well as store, recall, and process data in attached memory and/or in the data store 148. A single private wireless gateway 102 and a single communication device 120 are shown in FIG. 1, it is understood that the system 100 may comprise any number of such devices.

The communication device 120 comprises at least a communication circuit 121, a processor 126, and memory 128. The configuration of such devices may vary widely depending on the example and the intended purpose of the communication device 120. For example, the communication circuit 121, processor 126, and memory 128 may be relatively complex when the communication device 120 is a laptop computer and may be relatively simple when the communication device 120 is a temperature sensor. As such, the communication circuit 121 is described in terms of minimum capabilities. Specifically, the communication circuit 121 is at least capable of communicating with a corresponding communication circuit 104 at the private wireless gateway 102 to transmit and/or receive data relevant to the operation of the communication device 120 (e.g., control data, measurement data, and/or feedback). The processor 126 is capable of processing such data, and the memory 128 is capable of storing such data in some examples.

Further, the memory 128 is capable of storing a PRL 123, authentication information 124, rolling code data 125, and/or a secret function 127. The secret function 127 may also be implemented on and/or executed by the processor 126 as shown. The authentication information 124 is data sufficient to authenticate the communication device 120 onto a RAN. The authentication information 124 may include data indicating a subscription and/or other data used to determine a level of access to the RAN permitted to the communication device 120 (e.g., an international mobile subscriber identity (IMSI) and associated security data). The PRL 123 is an ordered list of roaming service providers that have an access agreement with a home service provider associated with the communication device 120. The authentication information 124 and the PRL 123 may provide sufficient data to authenticate the communication device 120 onto the RAN of a home service provider and/or a roaming service provider via the cell site 140.

However, as noted above, malicious entities may wish to access the RAN for the purpose of stealing network access by altering the PRL 123. While this process is not disclosed in detail for security reasons, the authentication information 124 and the PRL 123 may be spoofed and modified to obtain network 142 access via the cell site 140 as a roaming user while avoiding reporting to the corresponding billing system operating at the network 142. Accordingly, the communication device 120 is provisioned with a secret function 127 and, in some examples, rolling code data 125 in order to secure the PRL 123 from such fraudulent use. The secret function 127 is provisioned by a service provider when the communication device 120 is provided network access. The secret function 127 may include a pseudorandom number generator, a hash value function, or other algorithm capable of producing a predetermined ordered set of values based on a seed value. The rolling code data 125 can include the seed and/or relevant state data such as previous outputs of the secret function 127. The secret function 127 can be applied to the rolling code data 125 (e.g., the rolling code data 125 applied as an input to the secret function 127) in order to generate an ordered set of values that are predictable when the secret function 127 and the rolling code data 125 are known.

As such, the communication device 120 can generate an access value based on the secret function 127 and the rolling code data 125. The authentication information 124 and PRL 123 can be sent from the communication device 120 to the private wireless gateway 102 via the communication circuits 121 and 104 to obtain access to the RAN. Further, the access value generated based on the secret function 127 and the rolling code data 125 can be sent to private wireless gateway 102 to verify that the PRL 123 is legitimate.

The private wireless gateway 102 comprises the communication circuit 104, a processor 106, memory 108, and a cellular radio transceiver 116. The private wireless gateway 102 may also include other wired and/or wireless interfaces to support connectivity of local communication devices such as communication device 120. The private wireless gateway 102 may be a private wireless gateway or other wired and/or private wireless gateway. The private wireless gateway 102 may employ the communication circuit 104 to receive the authentication information 124, the PRL 123, and the access value from the communication device 120. The private wireless gateway 102 can evaluate the access value to determine whether the PRL 123 is legitimate. If so, the private wireless gateway 102 can transmit the authentication information 124 and the PRL 123 to the cell site 140 in order to proxy the communication device 120 onto the network 142. If not, the private wireless gateway 102 can ignore further communication attempts by the communication device 120.

Such evaluation of the access value may occur using one of several mechanisms as described below and may employ the processor 106, memory 108, and/or the cellular radio transceiver 116. In one example, a secret function 145 corresponding to secret function 127 is provisioned into the memory 108. The processor 106 generates a seed, applies the seed to the secret function 145, and saves the resulting expected access value as rolling code data 146 in memory 108. The communication circuit 104 forwards the seed to the communication device 120. If the communication device 120 can return an access value that matches the expected access value, then the PRL 123 is legitimate and the communication device 120 can be proxied onto the network 142. For further communication attempts, the seed can be incremented and/or the previous access value can be used as a new seed. In this way, a rolling code is created such that the communication device 120 must have the correct secret function 127 and rolling code data 125 (seed, previous access value, state data, etc.) in order to prove the validity of the PRL 123.

In another example, the private wireless gateway 102 can obtain the secret function 145 and/or the rolling code data 146 from the server 144 via the cell site 140 and the network 142. For example, the communication device 120 can be associated with a global seed value stored as rolling code data 146 and/or a specific secret function 145. In this way, the private wireless gateway 102 may not forward an initial seed to the communication device 120. The communication device 120 may instead employ the same secret function 127 and rolling code data 125 even when communicating with multiple the private wireless gateways 102. The private wireless gateway 102 obtains the secret function 127 and rolling code data 146 for authenticating the communication device 120 and then updates the rolling code data 146 at the server 144 for each access and/or session, depending on the example. The result is a rolling code that changes values in a predetermined order on each access/session regardless of which private wireless gateway 102 communicates with the communication device 120. In a specific example, a blockchain ledger associated with the communication device 120 can be employed to maintain the current rolling code data 146. Also, in some examples, the secret function 145 can be provisioned in memory 108 and the same secret function 145 used for every communication device 120. Meanwhile, the rolling code data 146 for each communication device 120 is specific to that communication device 120 and stored in memory on the server 144. Communication protocols for such example implementations are discussed in greater detail below.

Figure 2:
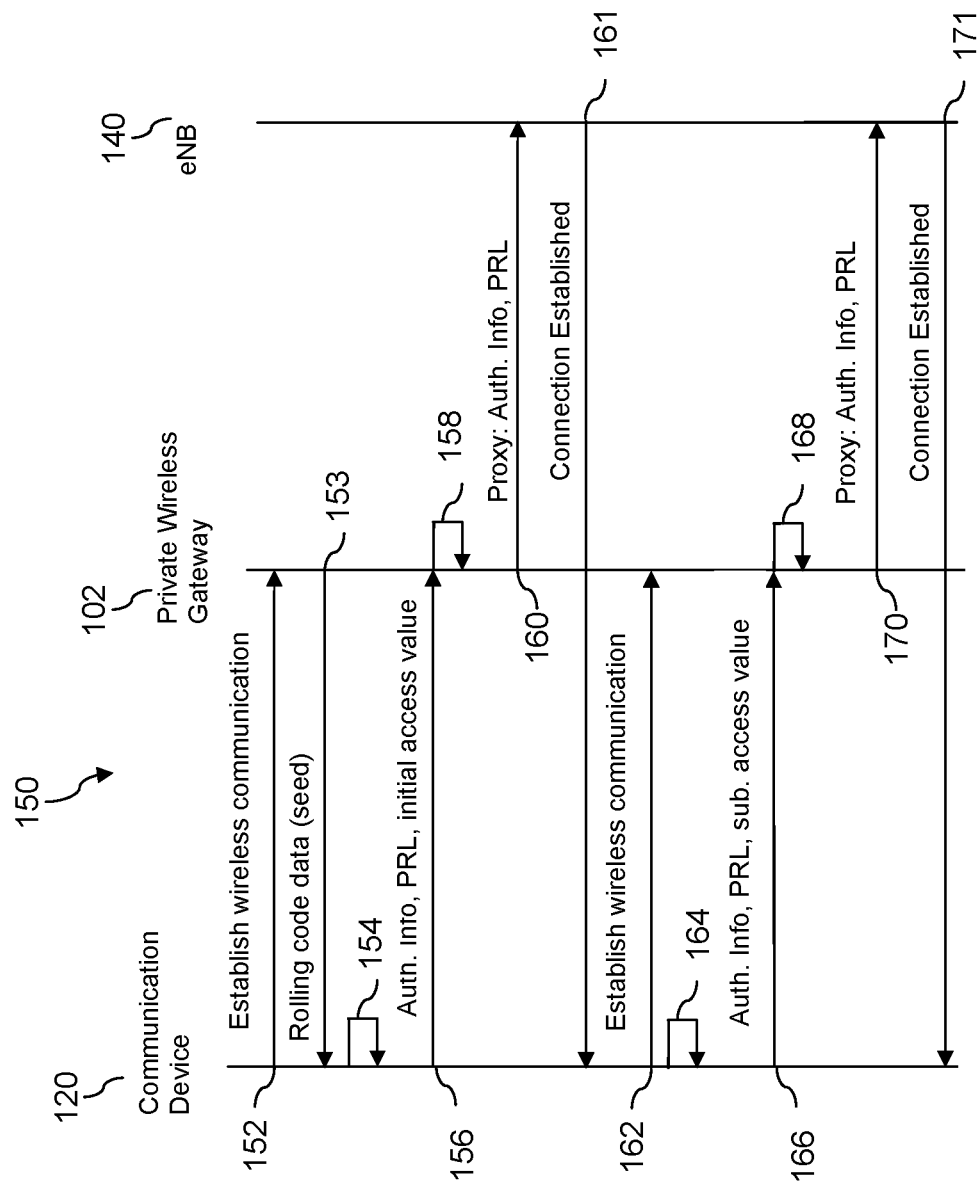
FIG. 2 is a message sequence diagram of a mechanism for verifying a PRL during establishment of a proxy based communication session via a private wireless gateway according to an embodiment of the disclosure.

Turning now to FIG. 2, a message sequence 150 is described. In an embodiment, the message sequence 150 supports verification of a PRL during establishment of a proxy based communication session via a private wireless gateway 102. The message sequence 150 operates between a communication device 120, a private wireless gateway 102, and a cell site 140, for example as shown in FIG. 1. Specifically, message sequence 150 describes an example where a seed value is supplied by the private wireless gateway 102 for managing rolling code based verification of a PRL at a communication device 120, such as an IoT device.

Prior to the initiation of message sequence 150, a secret function 127 is provisioned onto the communication device 120. The communication device 120 determines to connect to the Internet. Accordingly, the communication device 120 establishes a wireless communication link with the private wireless gateway 102 at label 152. Such wireless communication may be via RAN based communications and/or via local area network based wireless communications. The private wireless gateway 102 receives the communication of label 152 and generates a seed. The private wireless gateway 102 then responds by sending rolling code data including the seed to the communication device 120 at label 153.

At label 154, the communication device 120 applies the secret function to the seed received at label 153 to generate an initial access value. The communication device 120 can then save the seed, increment and save the seed, and/or save the initial access value as rolling code data for later use. The communication device 120 then forwards the initial access value, the PRL, and any other authentication information to the private wireless gateway 102 at label 156. The private wireless gateway 102 then receives such information. At label 158, the private wireless gateway 102 generates a first expected access value by applying a secret function to the seed of label 153. The private wireless gateway 102 can then compare the first expected access value to the initial access value in order to determine if the PRL and/or the authentication information is valid/legitimate. It should be noted that the present example presumes that the secret function is provisioned into the private wireless gateway 102 for use when communicating with all communication devices. However, the private wireless gateway 102 could obtain the secret function by communicating with the cell site 140 after label 152 and prior to label 158. It should also be noted that generation of the first expected access value is shown at label 158 for simplicity, but can be generated at any time after both the seed and secret function are known, for example before or after label 153.

Once the initial access value is verified at label 158, the private wireless gateway 102 can proxy the communication device 120 onto the RAN. Specifically, the private wireless gateway 102 can forward the authentication information and the PRL to the cell site 140 at label 160 and perform any other relevant communications to create a communication session between the private wireless gateway 102 and the RAN via the cell site 140 on behalf of the communication device 120. At label 161, a wireless communication link is established between the cell site 140 and the communication device 120 via the private wireless gateway 102. The communication device 120 can then communicate any specified data desired by the communication device 120. The private wireless gateway 102 can also save the seed, increment and save the seed, and/or save the initial access value/first expected access value as rolling code data for later use.

Once the communication between the communication device 120 and the RAN is complete, the wireless communication link of label 161 is torn down. As many IoT devices communicate relatively rarely, a significant amount of time may pass (e.g., minutes, hours, days, etc.). Sometime later, the communication device 120 may decide to communicate again. At label 162, the communication device 120 forwards a subsequent communication request to the private wireless gateway 102 in a manner similar to label 152. In this case, the private wireless gateway 102 need not respond with a seed as the rolling code data was saved by the communication device 120 after label 153. The communication device 120 can generate a subsequent access value by using the stored rolling code data as input to the secret function. For example, the communication device 120 can use an incremented seed and/or previous output from the secret function (e.g., the initial access value) as input to the secret function at label 164.

At label 166, the communication device 120 transmits the subsequent access value, the authentication information, and the PRL to the private wireless gateway 102. The private wireless gateway 102 generates a subsequent expected access value based on the secret function and the stored rolling code data at label 168. The private wireless gateway 102 can then compare the subsequent expected access value and the subsequent access value from the communication device 120 to verify the PRL in a manner similar to label 158. The distinction between label 158 and 168 is that the first expected access value is different than the subsequent expected access value, and likewise the initial access value is different than the subsequent access value. This is because the secret function uses different input values at label 158 and label 168. The net result is that the access value changes for each access in a way that is only predictable by a device that has awareness of the initial seed, the secret function, and the number of accesses. Hence, the access values become a rolling code that cannot be snooped, but is easily computed by simple computing resources that may be available on some IoT devices. Once the PRL is verified at label 168, the private wireless gateway 102 can proxy the communication device 120 onto the RAN via the cell site at label 170 and establish a wireless communication link with the communication device 120 at label 171 in a manner similar to labels 160 and 161, respectively.

Figure 3:
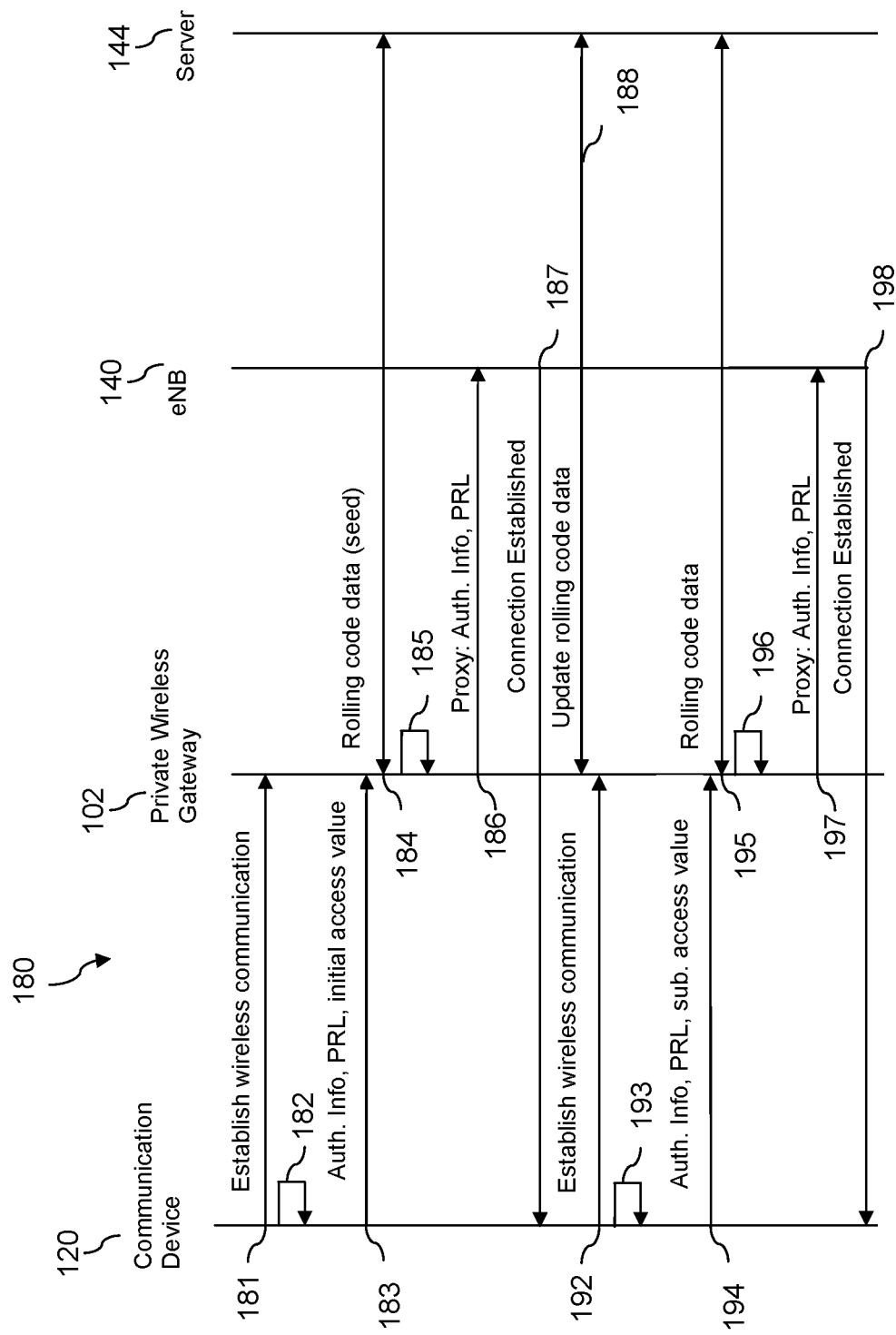
FIG. 3 is a message sequence diagram of a mechanism for verifying a PRL during establishment of a proxy based communication session via a private wireless gateway according to an embodiment of the disclosure.

Turning now to FIG. 3, a message sequence 180 is described. In an embodiment, the message sequence 180 supports verification of a PRL during establishment of a proxy based communication session via a private wireless gateway 102. The message sequence 180 operates between a communication device 120, a private wireless gateway 102, a cell site 140, and a server 144, for example as shown in FIG. 1. Specifically, message sequence 180 describes an example where device specific rolling code data is stored in the network 142, for example in the server 144, and supplied to each private wireless gateway 102 when a corresponding communication device 120 makes a communication request.

At label 181, the communication device 120 establishes a wireless communication link with a private wireless gateway 102 in a manner similar to label 152. In the present example, the initial seed and the secret function are provisioned onto the communication device 120 and stored on the server 144 when the communication device 120 is first provided access to the service provider network (e.g., upon purchasing a subscription). At label 182, the communication device 120 obtains the rolling code data containing the seed and the secret function from local memory. The communication device 120 can then generate an initial access value based on the seed and the secret function. At label 183, the communication device 120 forwards the initial access value, a PRL, and any relevant authentication information to the private wireless gateway 102 in a manner similar to label 156.

The private wireless gateway 102 receives the initial access value, PRL, and authentication information from the communication device 120. At label 184, the private wireless gateway 102 communicates with the server 144 to obtain the rolling code data for the communication device 120. In some examples, the secret algorithm is provisioned to the private wireless gateway 102 for general use with all communication devices 120 associated with a corresponding service provider. In other examples, the private wireless gateway 102 obtains the secret function from the server 144 as part of label 184. The private wireless gateway 102 can then generate a first expected access value to verify the PRL at label 185 and proxy the communication devices 120 onto the network via the cell site 140 at label 186 in a manner substantially similar to labels 158 and 160, respectively. A wireless communication link is also established at label 187 in a manner similar to label 161. Further, upon successful access, the rolling code data is updated at both the private wireless gateway 102 and the communication device 120. Such an update may include, as discussed in previous examples, incrementing the initial seed, using an access value as a subsequent seed, maintaining state data, etc. The updated rolling code data is forwarded from the private wireless gateway 102 back to the server 144 at label 188 for use in conjunction with future accesses by the communication device 120.

As with message sequence 150, the communication device 120 communicates any relevant data and shuts down the communication session. Sometime later, the communication device 120 determines to establish another communication link and/or session with the private wireless gateway 102 at label 192. At label 193, the communication device 120 generates a subsequent access value by employing the updated rolling code data and the secret function. At label 194 the communication device 120 forwards the subsequent access value, the PRL, and the authentication information in a manner similar to label 183.

At label 195, the private wireless gateway 102 obtains the rolling code data from the server 144 in a manner similar to label 184. The private wireless gateway 102 then generates a subsequent expected access value and verifies the PRL at label 196 in a manner similar to label 184. The difference is that the first expected access value is different than the subsequent expected access value, and likewise the initial access value is different than the subsequent access value. This is because the subsequent access value is generated from the same secret function, but from rolling code data updated after the previous wireless communication link/session was established. As the rolling code data is stored on the server 144, any private wireless gateway 102 can obtain the rolling code data. Accordingly, the rolling code data is global and specific to the communication device 120. As such, the rolling code proceeds in a consistent manner even when the communication device 120 moves between private wireless gateways 102.

The private wireless gateway 102 can then proxy the communication device 120 onto the network and establish a wireless communication link at labels 197 and 198 in a manner similar to labels 186 and 187, respectively. Further, the private wireless gateway 102 can further update the rolling code data and forward same to the server 144 for future use as described with respect to label 188. In addition, the communication device 120 can also update the rolling code data locally for future use.

Figure 4:
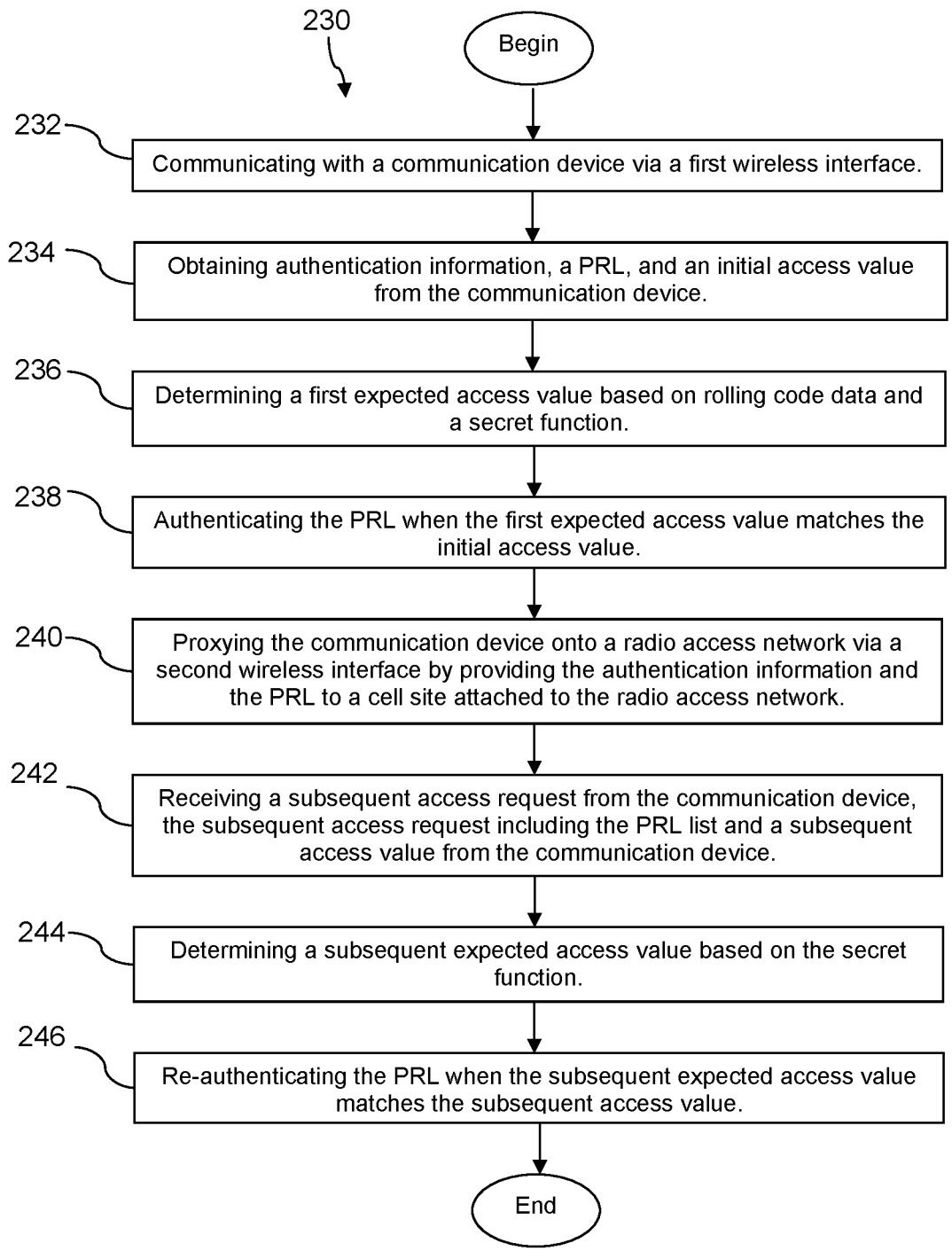
FIG. 4 is a flow chart of a method of authenticating a communication device onto a radio access network via a private wireless gateway according to an embodiment of the disclosure.

Turning now to FIG. 4, a method 230 is described. In an embodiment, the method 230 supports authenticating a communication device 120 onto a radio access network via a private wireless gateway 102. Specifically, method 230 is described from the perspective of the private wireless gateway 102.

At block 232, the private wireless gateway 102 communicates, with a communication device 120 via a first wireless interface. The communication may be initiated by the private wireless gateway 102 of by the communication device 120. In some examples, the communication device 120 from which the PRL is obtained is an IoT device. In some examples, the private wireless gateway 102 transmits rolling code data in the form of a seed to the communication device 120 as part of block 232 to support receiving an initial access value. In other examples, the rolling code data/seed is provisioned onto the communication device 120 prior to the initiation of method 230.

At block 234, the private wireless gateway 102 obtains authentication information, a PRL, and an initial access value from the communication device 120. The authentication information, PRL, and initial access value may be received from the communication device 120 over the first wireless interface. Further, the first wireless interface may be configured to act as a wireless local area network based interface in some examples. As noted above, the authentication and the PRL are employed to authenticate the communication device 120 onto the RAN. Further, the initial access value is employed to verify the authenticity of the PRL to prevent evasion of billing systems. It should be noted that obtaining such information may be initiated by the private wireless gateway 102 or by the communication device 120.

At block 236, the private wireless gateway 102 determines a first expected access value based on rolling code data and a secret function. It should be noted that the secret function is provisioned onto the communication device 120. In some examples, the secret function is also provisioned onto the private wireless gateway 102 for use in conjunction with many communication devices 120. In other examples, the private wireless gateway 102 obtains a secret function that is specific to the communication device 120 from a server via the RAN. Also, in some examples, the rolling code data is a seed generated by the private wireless gateway 102. In other examples, the rolling code data is device specific rolling code data associated with the communication device 120. For example, the rolling code data can be a seed provisioned onto the communication device 120 and also stored on a sever. In such cases, the private wireless gateway 102 obtains the rolling code data from the radio access network (e.g., from the server) prior to authenticating the PRL at block 238 below. As a specific example, the private wireless gateway 102 may obtain the rolling code data from a blockchain ledger via the radio access network prior to authenticating the PRL in some examples. Regardless of the example, the private wireless gateway 102 applies the secret function to the rolling code data to determine the first expected access value.

At block 238, the private wireless gateway 102 compares the first expected access value generated locally at the private wireless gateway 102 to the initial access value received from the communication device 120. When the first expected access value matches the initial access value, the private wireless gateway 102 authenticates the communication device 120 and proceeds to block 240. When the first expected access value does not match the initial access value, the private wireless gateway 102 does not authenticate the PRL and may discontinue responding to communications from the communication device 120 in some examples.

At block 240, the private wireless gateway 102 proxies the communication device 120 onto a radio access network via a second wireless interface. Proxying may include providing the authentication information and the PRL to a cell site attached to the radio access network. In some examples, the second wireless interface used to provide the PRL to the cell site may be a radio access network based interface. Once proxying is complete, the private wireless gateway 102 can manage any desired communications between the communication device 120 and the RAN. Once communications are complete, the private wireless gateway 102 can tear down the associated session and/or disconnect the communication device 120. In examples where the rolling code data is device specific and stored on the server, the private wireless gateway 102 may forward updated rolling code data to the server for use in conjunction with future communication attempts by the communication device 120.

Sometime later, the communication device 120 may wish to communicate again. Accordingly, the private wireless gateway 102 receives a subsequent access request from the communication device 120 at block 242. The subsequent access request may also include the PRL list, the authentication information, and a subsequent access value from the communication device 120. Specifically, the subsequent access value may be generated from the secret function. However, the seed value may be incremented and/or changed based on the previous output of the secret function. As such, the subsequent access value may be different than the initial access value.

At block 244, the private wireless gateway 102 may determine a subsequent expected access value based on the secret function. In some examples, the rolling code data may be stored at the private wireless gateway 102 from the previous access and used to generate the subsequent expected access value. In other cases, the rolling code data may be obtained from the server via the RAN.

At block 246, the private wireless gateway 102 re-authenticates the PRL when the subsequent expected access value matches the subsequent access value. It should be noted that the subsequent expected access value may be a different value than the first expected access value. If the subsequent expected access value does not match the subsequent access value, then the private wireless gateway 102 may discontinue communicating with the communication device 120. However, when the PRL is re-authenticated, the private wireless gateway 102 can proxy the communication device 120 onto the RAN for further communications and/or sessions.

It should be noted that method 230 describes the generation of expected access values as occurring in response to receiving access values from the communication device 120 for simplicity of discussion. However, the expected access values may be generated upon receiving a communication request from the communication device 120 and prior to receiving the access values in some examples.

Figure 5:
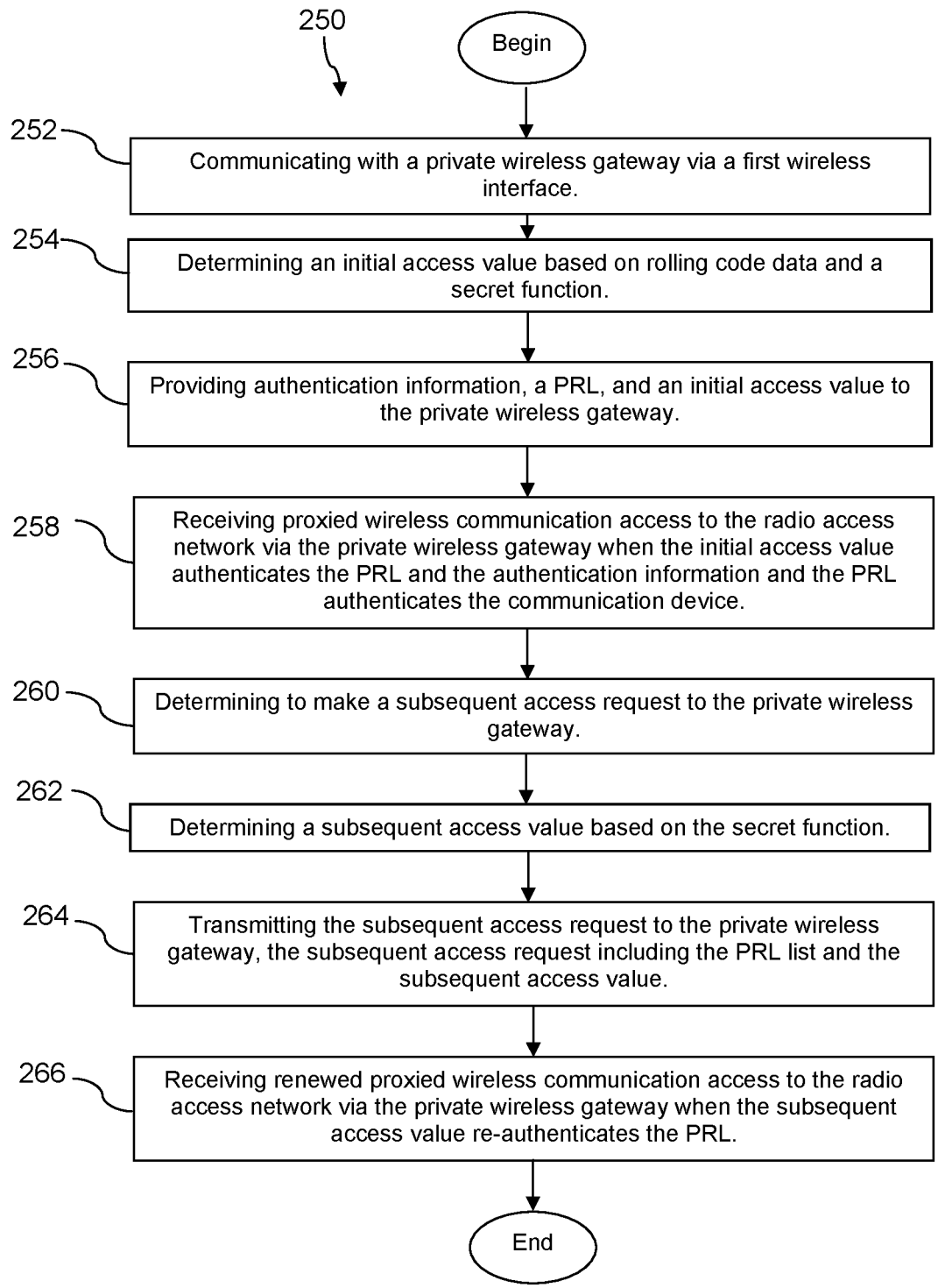
FIG. 5 is a flow chart of a method of obtaining authentication onto a radio access network via a private wireless gateway by a communication device according to an embodiment of the disclosure.

Turning now to FIG. 5, a method 250 is described. In an embodiment, the method 250 supports obtaining authentication onto a radio access network via a private wireless gateway 102 by a communication device 120. Specifically, method 250 is similar to method 230, but is described from the perspective of the communication device 120.

At block 252, the communication device 120 communicates with a private wireless gateway 102 via a first wireless interface. The communication device 120 may be an IoT device. Further, the first wireless interface may be configured to act as a wireless local area network based interface.

At block 254, the communication device 120 determines an initial access value based on rolling code data and a secret function. The secret function may be provisioned onto the communication device 120 when the communication device 120 is first approved onto a service provider's system. In some examples, the rolling code data is received from the private wireless gateway 102 as a seed value. In other examples, the rolling code data is provisioned onto the communication device 120 when the communication device 120 is first approved onto a service provider's system. For example, the rolling code data may be device specific rolling code data associated with the communication device, and stored in memory at the communication device 120. Regardless of the example, the communication device 120 applies the secret function to the rolling code data to obtain the initial access value.

At block 256, the communication device provides authentication information, a PRL, and an initial access value to the private wireless gateway 102. The authentication information and the PRL may be stored in memory and may be provisioned onto the communication device by the service provider.

Based on the initial access value, the private wireless gateway 102 verifies the PRL. The private wireless gateway 102 then uses the authentication information and the PRL to obtain access to the RAN on behalf of the communication device 120. Accordingly, communication device 120 receives proxied wireless communication access to the RAN via the private wireless gateway at block 258. This occurs when the initial access value authenticates the PRL and when the authentication information and the PRL authenticates the communication device.

The communication device 120 can transmit any desired data via the private wireless gateway 102. The communication device 120 can allow the communication session to time out and/or disconnect from the session and then await a time when further communication is desired. The communication device 120 can also update the rolling code data by incrementing the seed, storing the initial access value for use as a further seed, etc.

At block 260, the communication device 120 determines to make a subsequent access request to the private wireless gateway 102. Hence, the communication device 120 determines a subsequent access value based on the secret function at block 262. The subsequent access value is based on different rolling code data, and is therefore a different value than the initial access value.

At block 264, the communication device 120 transmits the subsequent access request to the private wireless gateway 102. The subsequent access request includes the PRL list, the authentication information, and the subsequent access value. The private wireless gateway 102 can then verify the subsequent access value to validate the PRL. The private wireless gateway 102 can then employ the authentication information and the PRL to authenticate the communication device 120 onto the RAN. Hence, the communication device 120 receives renewed proxied wireless communication access to the RAN via the private wireless gateway when the subsequent access value re-authenticates the PRL.

Figure 6:
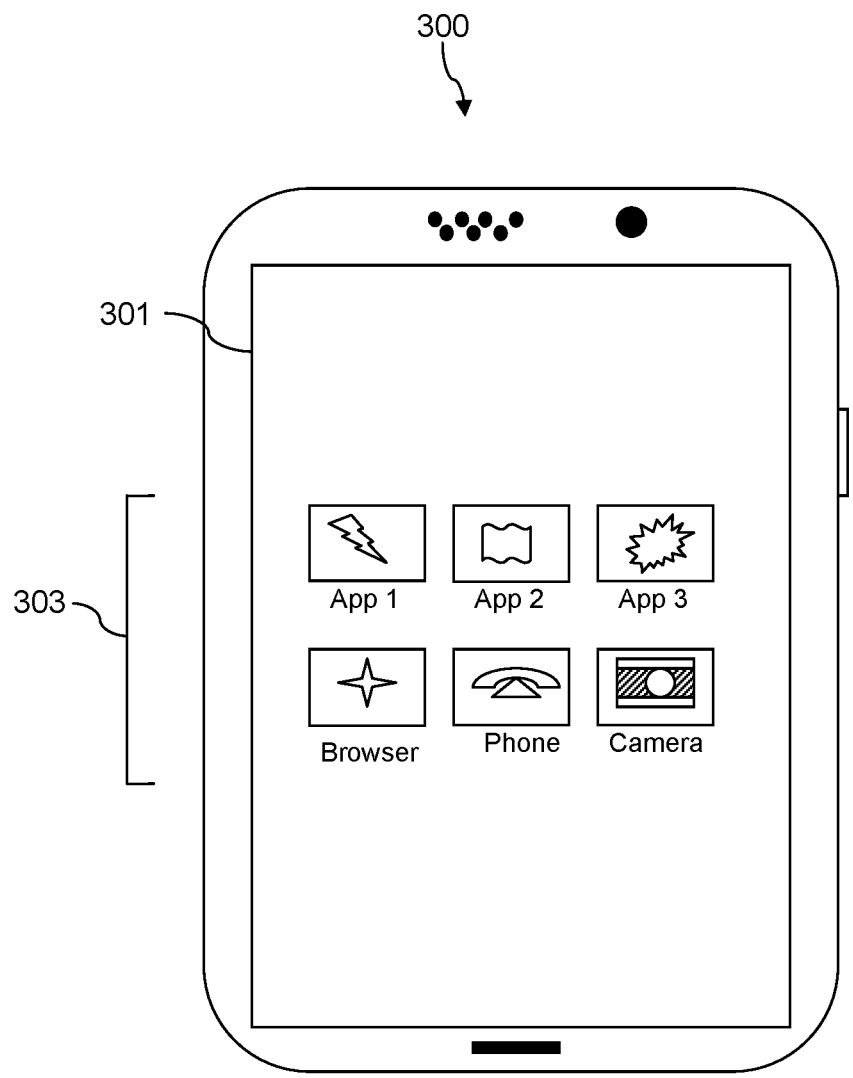
FIG. 6 is an illustration of a mobile communication device according to an embodiment of the disclosure.

FIG. 6 depicts the UE 300, which is operable for implementing aspects of the present disclosure, but the present disclosure should not be limited to these implementations. Though illustrated as a mobile phone, the UE 300 may take various forms including a wireless handset, a pager, a personal digital assistant (PDA), a gaming device, a media player, and/or an IoT device. The UE 300 includes a touchscreen display 301 having a touch-sensitive surface for input by a user. A small number of application icons 303 are illustrated within the touch screen display 301. It is understood that in different embodiments, any number of application icons 303 may be presented in the touch screen display 301. In some embodiments of the UE 300, a user may be able to download and install additional applications on the UE 300, and an icon associated with such downloaded and installed applications may be added to the touch screen display 301 or to an alternative screen. The UE 300 may have other components such as electro-mechanical switches, speakers, camera lenses, microphones, input and/or output connectors, and other components as are well known in the art. The UE 300 may present options for the user to select, controls for the user to actuate, and/or cursors or other indicators for the user to direct. The UE 300 may further accept data entry from the user, including numbers to dial or various parameter values for configuring the operation of the handset. The UE 300 may further execute one or more software or firmware applications in response to user commands. These applications may configure the UE 300 to perform various customized functions in response to user interaction. Additionally, the UE 300 may be programmed and/or configured over-the-air, for example from a wireless base station, a wireless access point, or a peer UE 300. The UE 300 may execute a web browser application which enables the touch screen display 301 to show a web page. The web page may be obtained via wireless communications with a base transceiver station, a wireless network access node, a peer UE 300 or any other wireless communication network or system.

Figure 7:
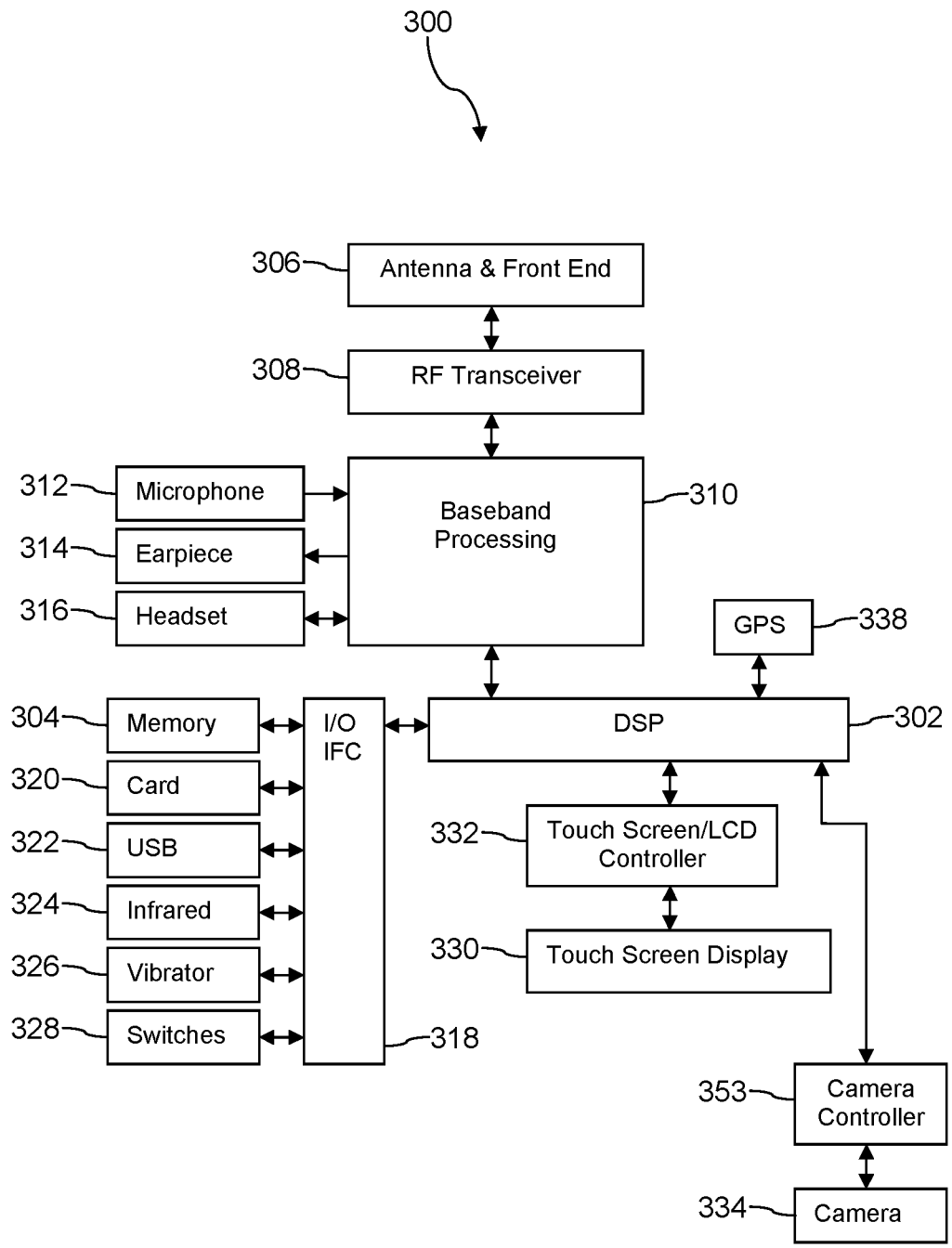
FIG. 7 is a block diagram of a hardware architecture of a mobile communication device according to an embodiment of the disclosure.

FIG. 7 shows a block diagram of the UE 300. While a variety of known components of handsets are depicted, in an embodiment a subset of the listed components and/or additional components not listed may be included in the UE 300. The UE 300 includes a digital signal processor (DSP) 302 and a memory 304. As shown, the UE 300 may further include an antenna and front end unit 306, a radio frequency (RF) transceiver 308, a baseband processing unit 310, a microphone 312, an earpiece speaker 314, a headset port 316, an input/output interface 318, a removable memory card 320, a universal serial bus (USB) port 322, an infrared port 324, a vibrator 326, one or more electro-mechanical switches 328, a touch screen liquid crystal display (LCD) with a touch screen display 330, a touch screen/LCD controller 332, a camera 334, a camera controller 336, and a global positioning system (GPS) receiver 338. In an embodiment, the UE 300 may include another kind of display that does not provide a touch sensitive screen. In an embodiment, the UE 300 may include both the touch screen display 330 and additional display component that does not provide a touch sensitive screen. In an embodiment, the DSP 302 may communicate directly with the memory 304 without passing through the input/output interface 318. Additionally, in an embodiment, the UE 300 may comprise other peripheral devices that provide other functionality.

The DSP 302 or some other form of controller or central processing unit operates to control the various components of the UE 300 in accordance with embedded software or firmware stored in memory 304 or stored in memory contained within the DSP 302 itself. In addition to the embedded software or firmware, the DSP 302 may execute other applications stored in the memory 304 or made available via information carrier media such as portable data storage media like the removable memory card 320 or via wired or wireless network communications. The application software may comprise a compiled set of machine-readable instructions that configure the DSP 302 to provide the desired functionality, or the application software may be high-level software instructions to be processed by an interpreter or compiler to indirectly configure the DSP 302.

The DSP 302 may communicate with a wireless network via the analog baseband processing unit 310. In some embodiments, the communication may provide Internet connectivity, enabling a user to gain access to content on the Internet and to send and receive e-mail or text messages. The input/output interface 318 interconnects the DSP 302 and various memories and interfaces. The memory 304 and the removable memory card 320 may provide software and data to configure the operation of the DSP 302. Among the interfaces may be the USB port 322 and the infrared port 324. The USB port 322 may enable the UE 300 to function as a peripheral device to exchange information with a personal computer or other computer system. The infrared port 324 and other optional ports such as a Bluetooth® interface or an IEEE 802.11 compliant wireless interface may enable the UE 300 to communicate wirelessly with other nearby handsets and/or wireless base stations. In an embodiment, the UE 300 may comprise a near field communication (NFC) transceiver. The NFC transceiver may be used to complete payment transactions with point-of-sale terminals or other communications exchanges. In an embodiment, the UE 300 may comprise a radio frequency identify (RFID) reader and/or writer device.

The switches 328 may couple to the DSP 302 via the input/output interface 318 to provide one mechanism for the user to provide input to the UE 300. Alternatively, one or more of the switches 328 may be coupled to a motherboard of the UE 400 and/or to components of the UE 300 via a different path (e.g., not via the input/output interface 318), for example coupled to a power control circuit (power button) of the UE 300. The touch screen display 330 is another input mechanism, which further displays text and/or graphics to the user. The touch screen LCD controller 332 couples the DSP 302 to the touch screen display 330. The GPS receiver 338 is coupled to the DSP 302 to decode global positioning system signals, thereby enabling the UE 300 to determine its position.

Figure 8A:
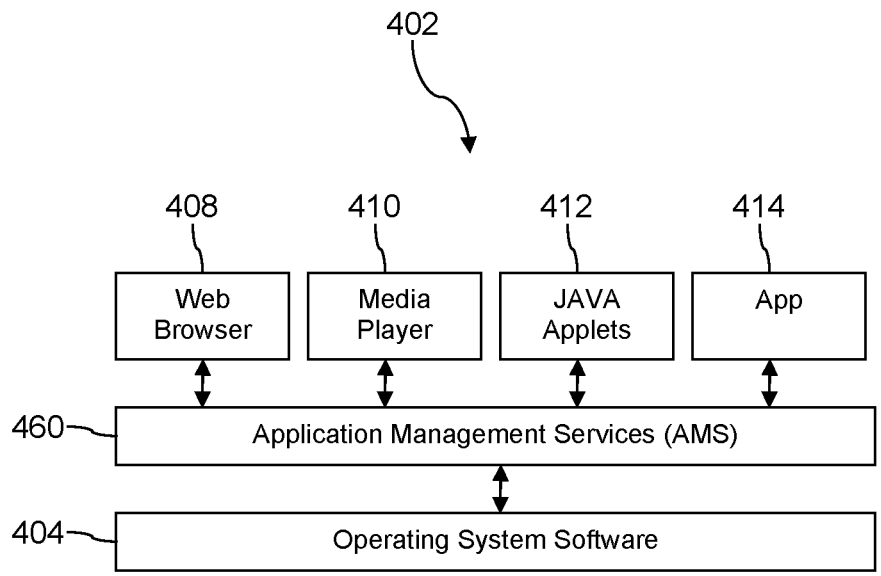
FIG. 8A is a block diagram of a software architecture of a mobile communication device according to an embodiment of the disclosure.

FIG. 8A illustrates a software environment 402 that may be implemented by the DSP 302. The DSP 302 executes operating system software 404 that provides a platform from which the rest of the software operates. The operating system software 404 may provide a variety of drivers for the handset hardware with standardized interfaces that are accessible to application software. The operating system software 404 may be coupled to and interact with application management services (AMS) 406 that transfer control between applications running on the UE 300. Also shown in FIG. 8A are a web browser application 408, a media player application 410, and JAVA applets 412. The web browser application 408 may be executed by the UE 300 to browse content and/or the Internet, for example when the UE 300 is coupled to a network via a wireless link. The web browser application 408 may permit a user to enter information into forms and select links to retrieve and view web pages. The media player application 410 may be executed by the UE 300 to play audio or audiovisual media. The JAVA applets 412 may be executed by the UE 300 to provide a variety of functionality including games, utilities, and other functionality.

Figure 8B:
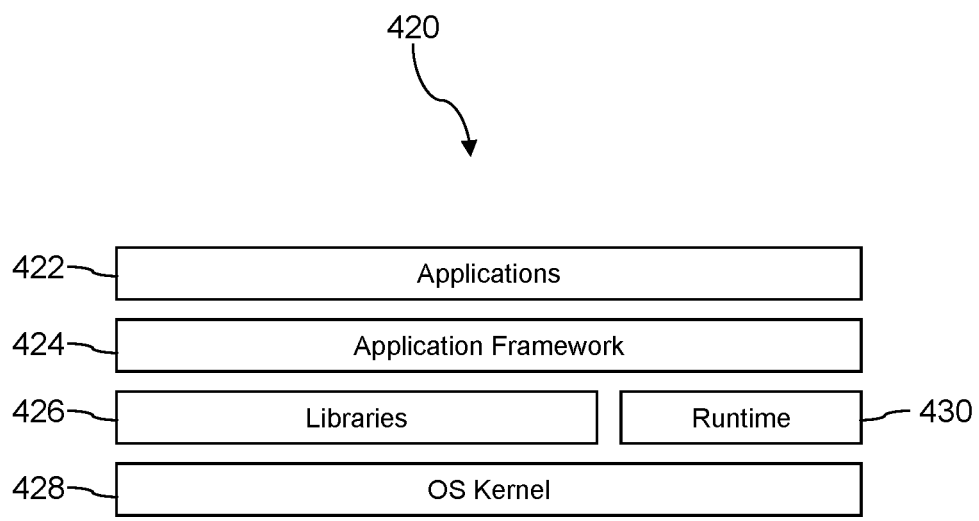
FIG. 8B is a block diagram of another software architecture of a mobile communication device according to an embodiment of the disclosure.

FIG. 8B illustrates an alternative software environment 420 that may be implemented by the DSP 302. The DSP 302 executes operating system kernel (OS kernel) 428 and an execution runtime 430. The DSP 302 executes applications 422 that may execute in the execution runtime 430 and may rely upon services provided by the application framework 424. Applications 422 and the application framework 424 may rely upon functionality provided via the libraries 426.

Figure 9:
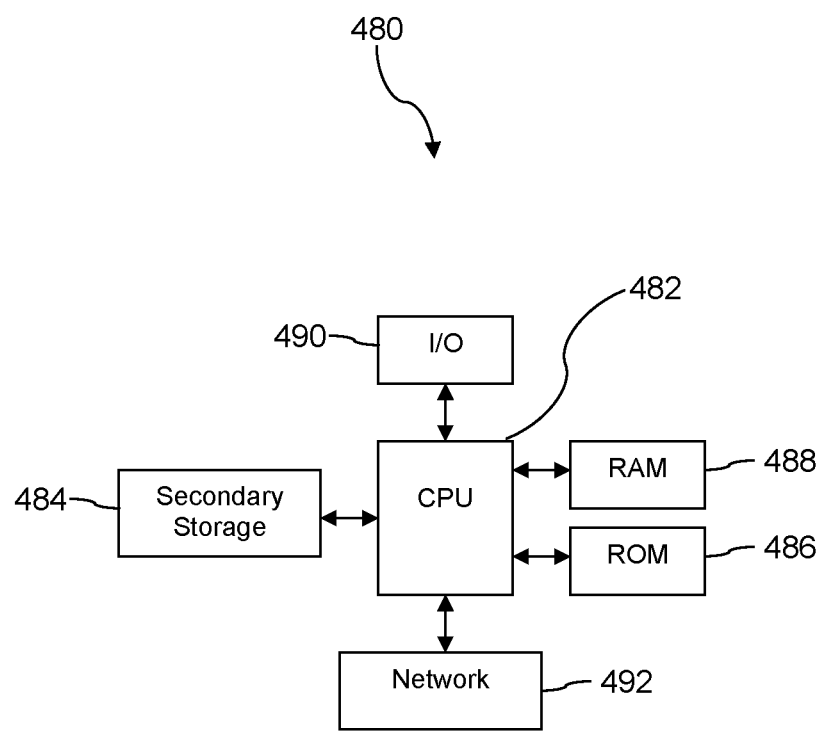
FIG. 9 is a block diagram of a computer system according to an embodiment of the disclosure.

FIG. 9 illustrates a computer system 480 suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor 482 may be implemented as one or more CPU chips.

It is understood that by programming and/or loading executable instructions onto the computer system 480, at least one of the CPU 482, the RAM 488, and the ROM 486 are changed, transforming the computer system 480 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 480 is turned on or booted, the CPU 482 may execute a computer program or application. For example, the CPU 482 may execute software or firmware stored in the ROM 486 or stored in the RAM 488. In some cases, on boot and/or when the application is initiated, the CPU 482 may copy the application or portions of the application from the secondary storage 484 to the RAM 488 or to memory space within the CPU 482 itself, and the CPU 482 may then execute instructions that the application is comprised of. In some cases, the CPU 482 may copy the application or portions of the application from memory accessed via the network connectivity devices 492 or via the I/O devices 490 to the RAM 488 or to memory space within the CPU 482, and the CPU 482 may then execute instructions that the application is comprised of. During execution, an application may load instructions into the CPU 482, for example load some of the instructions of the application into a cache of the CPU 482. In some contexts, an application that is executed may be said to configure the CPU 482 to do something, e.g., to configure the CPU 482 to perform the function or functions promoted by the subject application. When the CPU 482 is configured in this way by the application, the CPU 482 becomes a specific purpose computer or a specific purpose machine.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage 484. The RAM 488 is used to store volatile data and perhaps to store instructions. Access to both ROM 486 and RAM 488 is typically faster than to secondary storage 484. The secondary storage 484, the RAM 488, and/or the ROM 486 may be referred to in some contexts as computer readable storage media and/or non-transitory computer readable media.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 492 may enable the processor 482 to communicate with the Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 482 executes instructions, codes, computer programs, scripts which it accesses from hard disk, floppy disk, optical disk (these various disk based systems may all be considered secondary storage 484), flash drive, ROM 486, RAM 488, or the network connectivity devices 492. While only one processor 482 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 484, for example, hard drives, floppy disks, optical disks, and/or other device, the ROM 486, and/or the RAM 488 may be referred to in some contexts as non-transitory instructions and/or non-transitory information.

In an embodiment, the computer system 480 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 480 to provide the functionality of a number of servers that is not directly bound to the number of computers in the computer system 480. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 480, at least portions of the contents of the computer program product to the secondary storage 484, to the ROM 486, to the RAM 488, and/or to other non-volatile memory and volatile memory of the computer system 480. The processor 482 may process the executable instructions and/or data structures in part by directly accessing the computer program product, for example by reading from a CD-ROM disk inserted into a disk drive peripheral of the computer system 480. Alternatively, the processor 482 may process the executable instructions and/or data structures by remotely accessing the computer program product, for example by downloading the executable instructions and/or data structures from a remote server through the network connectivity devices 492. The computer program product may comprise instructions that promote the loading and/or copying of data, data structures, files, and/or executable instructions to the secondary storage 484, to the ROM 486, to the RAM 488, and/or to other non-volatile memory and volatile memory of the computer system 480.

In some contexts, the secondary storage 484, the ROM 486, and the RAM 488 may be referred to as a non-transitory computer readable medium or a computer readable storage media. A dynamic RAM embodiment of the RAM 488, likewise, may be referred to as a non-transitory computer readable medium in that while the dynamic RAM receives electrical power and is operated in accordance with its design, for example during a period of time during which the computer system 480 is turned on and operational, the dynamic RAM stores information that is written to it. Similarly, the processor 482 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of authenticating a communication device onto a radio access network via a private wireless gateway, the method comprising:
   communicating, by the private wireless gateway, with the communication device via a first wireless interface;
   obtaining, by the private wireless gateway, authentication information, a preferred roaming list (PRL), and an initial access value from the communication device, wherein the initial access value is based on a rolling code data and a secret function, wherein the rolling code data is device specific rolling code data associated with the communication device that is updated each time a device requests access to a radio access network, and wherein the private wireless gateway obtains the rolling code data from a blockchain ledger via the radio access network prior to authenticating the PRL;
   determining, by the private wireless gateway, a first expected access value by inputting the rolling code data into the secret function;
   authenticating, by the private wireless gateway, the PRL when the first expected access value matches the initial access value;
   proxying, by the private wireless gateway, the communication device onto the radio access network via a second wireless interface, the proxying including providing the authentication information and the PRL to a cell site attached to the radio access network;
   obtaining, by the private wireless gateway, second authentication information, a second PRL, and a second initial access value from a second communication device, wherein the second initial access value is based on second rolling code data and the secret function, and wherein the second rolling code data is different from the rolling code data;
   determining, by the private wireless gateway, a second expected access value by inputting the second rolling code data into the secret function; and
   authenticating, by the private wireless gateway, the second PRL when the second expected access value matches the second initial access value.

2. The method of claim 1, further comprising:
   receiving, at the private wireless gateway, a subsequent access request from the communication device, the subsequent access request including the PRL and a subsequent access value from the communication device;
   determining, by the private wireless gateway, a subsequent expected access value based on the secret function; and
   re-authenticating, by the private wireless gateway, the PRL when the subsequent expected access value matches the subsequent access value, wherein the subsequent expected access value is a different value than the first expected access value and the subsequent access value is a different value than the initial access value.

3. The method of claim 1, wherein the private wireless gateway transmits the rolling code data to the communication device.

4. The method of claim 1, wherein the PRL is received from the communication device over the first wireless interface which is configured to act as a wireless local area network based interface, and wherein the second wireless interface used to provide the PRL to the cell site is a radio access network based interface.

5. The method of claim 1, wherein the communication device from which the PRL is obtained is an internet of things (IoT) device.

6. A private wireless gateway, comprising:
   a first wireless interface configured to:
      communicate with a communication device,
      obtain authentication information, a preferred roaming list (PRL), and an initial access value from the communication device, wherein the initial access value is based on a rolling code data and a secret function, and wherein the rolling code data is device specific rolling code data associated with the communication device that is updated each time a device requests access to a radio access network, and
      obtain second authentication information, a second PRL, and a second initial access value from a second communication device, wherein the second initial access value is based on second rolling code data and the secret function, and wherein the second rolling code data is different from the rolling code data;
   a processor coupled to the first wireless interface, the processor configured to:
      determine a first expected access by inputting the rolling code data into the secret function,
      authenticate the PRL when the first expected access value matches the initial access value,
      determine a second expected access value by inputting the second rolling code data into the secret function, and
      authenticate the second PRL when the second expected access value matches the second initial access value; and
   a second wireless interface coupled to the processor, the second wireless interface configured to:
      obtain the rolling code data from a blockchain ledger via the radio access network prior to authentication of the PRL, and
      proxy the communication device onto the radio access network, the proxying including providing the authentication information and the PRL to a cell site attached to the radio access network.

7. The private wireless gateway of claim 6, wherein the first wireless interface is further configured to receive a subsequent access request from the communication device, the subsequent access request including the PRL and a subsequent access value from the communication device, wherein the processor is further configured to determine a subsequent expected access value based on the secret function, and re-authenticate the PRL when the subsequent expected access value matches the subsequent access value, and wherein the subsequent expected access value is a different value than the first expected access value and the subsequent access value is a different value than the initial access value.

8. The private wireless gateway of claim 6, wherein the first wireless interface is further configured to transmit the rolling code data to the communication device.

9. The private wireless gateway of claim 6, wherein the first wireless interface used to obtain the PRL is configured to act as a wireless local area network based interface, and wherein the second wireless interface used to provide the PRL to the cell site is a radio access network based interface.

10. The private wireless gateway of claim 6, wherein the communication device from which the PRL is obtained is an internet of things (IoT) device.

11. A method of obtaining authentication onto a radio access network via a private wireless gateway by a communication device, the method comprising:
- communicating, by the communication device, with the private wireless gateway via a first wireless interface;
- determining, by the communication device, an initial access value by inputting a rolling code data into a secret function, wherein the rolling code data is device specific rolling code data associated with the communication device that is updated each time a device requests access to the radio access network;
- providing, by the communication device, authentication information, a preferred roaming list (PRL), and the initial access value to the private wireless gateway, wherein the private wireless gateway obtains the rolling code data from a blockchain ledger via the radio access network prior to authenticating the PRL;
- receiving, by the communication device, proxied wireless communication access to the radio access network via the private wireless gateway when the initial access value authenticates the PRL and when the authentication information and the PRL authenticates the communication device;
- communicating, by a second communication device, with the private wireless gateway via the first wireless interface;
- determining, by the second communication device, a second initial access value by inputting second rolling code data into the secret function, wherein the second rolling code data is different from the rolling code data;
- providing, by the second communication device, second authentication information, a second PRL, and the second access value to the private wireless gateway; and
- receiving, by the second communication device, proxied wireless communication access to the radio access network via the private wireless gateway when the second initial access value authenticates the second PRL and when the second authentication information and the second PRL authenticates the second communication device.

12. The method of claim 11, further comprising:
- determining, by the communication device, to make a subsequent access request to the private wireless gateway;
- determining, by the communication device, a subsequent access value based on the secret function;
- transmitting, by the communication device, the subsequent access request to the private wireless gateway, the subsequent access request including the PRL and the subsequent access value; and
- receiving, by the communication device, renewed proxied wireless communication access to the radio access network via the private wireless gateway when the subsequent access value re-authenticates the PRL, wherein the subsequent access value is a different value than the initial access value.

13. The method of claim 11, further comprising receiving the rolling code data from the private wireless gateway.

14. The method of claim 11, wherein the rolling code data is stored in memory at the communication device.

15. The method of claim 11, wherein the PRL is provided to the private wireless gateway over the first wireless interface which is configured to act as a wireless local area network based interface.

16. The method of claim 11, wherein the communication device providing the PRL is an internet of things (IoT) device.

* * * * *